Patented July 21, 1931

1,815,886

UNITED STATES PATENT OFFICE

HERMAN ALEXANDER BRUSON, OF GERMANTOWN, PENNSYLVANIA, ASSIGNOR TO ROHM & HAAS COMPANY, OF PHILADELPHIA, PENNSYLVANIA

CONDENSATION PRODUCT AND METHOD OF PREPARING

No Drawing.   Application filed October 22, 1930. Serial No. 490,553.

This invention relates to a composition prepared essentially from an organic polybasic acid or its anhydride and an aliphatic, polyhydroxylated monobasic acid.

The object of this invention is to produce tough, rubber-like plastic masses useful in coating compositions, lacquers, and varnishes where unusual flexibility, adhesion, and waterproofness are desired, as in coatings for leather, paper, textile fabrics, rubber, rubberized cloth, artificial leather, thin sheet metal, and the like.

It is already known that resins may be obtained by heating organic polybasic acids or their anhydrides with polyhydric alcohols such as glycerol, glycols, mannitol, and pentaerithrite, with or without the addition of organic monobasic acids. According to the present invention however, no polyhydric alcohol whatsoever is used; condensation being effected between two organic acids, one being a polybasic acid, and the other a polyhydroxylated monobasic acid of the aliphatic series, having the general formula:

$$C_nH_{2n-y}(OH)_{y+1}\text{-COOH}$$

wherein "$n$" is a whole number equal to 17 or 21 and "$y$" is a whole number between 1 and 5 inclusive.

Typical examples of such acids are:

Dihydroxy-stearic acid_____ $C_{17}H_{33}(OH)_2$-COOH
Trihydroxy-stearic acid_____ $C_{17}H_{32}(OH)_3$-COOH
Tetrahydroxy-stearic acid_____ $C_{17}H_{31}(OH)_4$-COOH
Hexahydroxy-stearic acid _____ $C_{17}H_{29}(OH)_6$-COOH
Dihydroxybehenic acid_____ $C_{21}H_{41}(OH)_2$-COOH and the like, it being understood that mixtures and all stereo-isomers thereof are included herein. These acids are readily obtained by oxidizing unsaturated oils, or fatty acids of unsaturated oils of vegetable or animal origin such as olive oil, oleic acid, castor oil, ricinoleic acid, fish oil, linseed oil, rape seed oil, linseed oil fatty acids, tung oil, tung oil fatty acids and the like, with dilute alkaline potassium permanganate solution, or by means of concentrated sulphuric acid, by methods already known.

In practicing one form of my invention, an organic polybasic acid, for example phthalic acid (or phthalic anhydride) is mixed in equi-molecular quantity with the polyhydroxylated monobasic acid, for example 9, 10-dihydroxy-stearic acid, which is obtained from the alkaline permanganate oxidation of oleic acid. The mixture is heated with stirring in a kettle provided with an outlet for the water vapor which is formed. A temperature of 190—200° C. has been found to be a suitable working temperature, although temperatures as low as 140° C. and as high as 250° C. may be used.

During the condensation the mixture gradually forms a homogeneous melt which passes through several distinct stages. In the first stage a translucent hard wax is obtained which eventually forms a transparent oily liquid. The latter proceeds to become more viscous as heating is continued. If the condensation is interrupted at this point, a very tough, rubbery material is obtained which is readily soluble in acetone. Prolonged heating converts this material into an extremely tough, rubbery mass which can be used in some measure as a rubber substitute. In the soluble stage, solutions of this resin may be used in coating compositions of the most diverse nature, also as adhesive or impregnating solutions. Instead of phthalic acid, one may use other suitable polybasic organic acids namely, succinic, maleic, glutaric, adipic, pimelic, suberic, azelaic, sebacic, citric, tartaric, malic, benzophenone-2, 4'-dicarboxyllic, diglycollic, diphenic and naphthalic or their obvious equivalents, in the above condensation.

The resins obtained are in every case different from those obtained by condensing the above polybasic acids with polyhydric alcohols as is generally practiced in the art. The resins made by the present process possess much greater toughness, softness, elasticity, and waterproofness, and are more of a waxy nature than the resins prepared by the processes that are already known.

If desired, the condensation between the polybasic acid and the polyhydroxylated acid may be carried out in the presence of fatty oils such as castor oil, linseed oil, tung oil, rape seed oil, fish oils and other oils of the drying or semi-drying type to form viscous oily masses suitable for use in coating compositions. Or the condensation may be carried out in the presence of additional acids such as the crude acid mixtures obtained from the hydrolysis of natural fatty glycerides, namely, linseed oil fatty acids, tung oil fatty acids, rape seed oil fatty acids, castor oil fatty acids and the like. This may be accomplished by adding from 30 to 150 per cent by weight of the fatty oil or of the crude fatty acids from the hydrolysis of the oils mentioned above, to the condensation mixture at any time during the condensation process, preferably at the very beginning of the heating. The purified acids such as oleic, stearic, linoleic, linolenic, elaeostearic may be added if desired in lieu of the crude mixture of such acids. In order to more fully illustrate the general method of practicing my invention, the following examples are given, it being understood that the parts are by weight.

*Example 1*

148 parts phthalic anhydride (1 mole), and 316 parts of 9,10-dihydroxy stearic acid (1 mole), of melting point 125–130°C. are placed in a suitable vessel equipped with a stirrer, and with an exit vent for the water vapor formed in the process, and heated rapidly to 200° C. The mixture is stirred when molten and heating continued for a sufficient length of time, usually 1½ to 3 hours, at 200° C. until a resin having the desired physical properties is obtained. After about 1¾ hours heating a plastic, rubber-like mass is formed which dissolves in acetone, butyl acetate, glycol monoethyl ether and other organic solvents. Upon further heating this material at 200° C. it becomes much tougher and insoluble in the common organic solvents. It has a very high tensile strength and is exceedingly elastic; whereas resins prepared from phthalic anhydride and glycerol or ethylene glycol are respectively, hard and brittle or sirupy liquids.

The phthalic anhydride may be replaced by an equivalent molecular quantity of other suitable polybasic acid namely, succinic, maleic, glutaric, adipic, pimelic, suberic, azelaic, sebacic, benzophenone-2,4'-dicarboxylic, citric, tartaric, malic, diglycollic, diphenic, and naphthelac acids.

In general the aliphatic dibasic acids give softer and tackier resins when condensed as described above than do the aromatic dibasic acids.

In place of the pure 9,10 dihydroxystearic acid-1, one may use the crude acid mixture obtained by the alkaline permanganate oxidation of oleic acid, which contains principally 9,10-dihydroxystearic acid-1 and other polyhydroxy fatty acids of lower melting point. Or one may use the isomeric 9,12-dihydroxystearic acids of melting point 90° C. and 69° C. respectively such as are obtained by the treatment of castor oil fatty acids (ricinoleic acid) with concentrated sulphuric acid at low temperatures, either in the purified state or in the form of the crude acid mixture without purification. (Grün, Berichte deutschen Chem. Gesellschaft. 39, 4403—4407.) These crude acid mixtures consisting of polyhydroxylated monobasic acids are hereafter referred to as "crude hydroxylated fatty acids" as distinguished from the purified compounds, regardless of the method by which they are produced.

One may also use tri-, tetra, and hexahydroxy-stearic acids of the most diverse nature, preferably in such quantity that each free hydroxyl group of the polyhydroxy stearic acid is equivalent to one carboxyl group of the polybasic acid used. The ratio of dibasic acid to polyhydroxy stearic acid is not however limited to these quantities. Thus one may condense 1, 1½ or 2 moles of the dibasic acid with for example, 1 mole of 9, 10, 12, 13-tetrahydroxy stearic acid-1, (sativic acid) such as is obtained by oxidizing linoleic acid or the crude mixture of linseed oil fatty acids with dilute potassium permanganate solution, and obtain a resin in each case.

Acids such as 9.10.12-trihydroxy stearic acid-1 and the crude trihydroxylated fatty acids from the oxidation of castor oil or of castor oil fatty acids; the 13,14-dihydroxy behenic acid-1 or the crude dihydroxylated fatty acids from the oxidation of rape seed oil fatty acids or of erucic acid with dilute alkaline permanganate solution; the 9,10,12,-13,15,16-hexahydroxy stearic acid-1 (linusic acid) or the crude hydroxylated fatty acids obtained by oxidation from linseed oil, may likewise be employed in lieu of the dihydroxystearic acid as described above.

In each case, rubbery, elastic resins having a high degree of waterproofness, adhesion and toughness may be obtained, such as cannot be duplicated if polyhydric alcohols are used by methods already known.

*Example 2*

148 parts phthalic anhydride (1 mole), 332 parts (1 mole) of 9,10,12-trihydroxy stearic acid-1 (consisting of a mixture of at least two isomers as ordinarily obtained by oxidizing castor oil fatty acids with alkaline potassium permanganate (Hazura and Grüssner, Monatshefte für Chemie, 9, p. 476) are mixed together with 275 parts of linseed oil fatty acids (from the hydrolysis of raw linseed oil and consisting of the crude fatty acid mixture without purification) and the mixture is heated at 200° C. with stirring, in an atmosphere of carbon dioxide or nitrogen until a resin of the desired physical properties is obtained. A viscous oily resin is formed after about 4 hours of heating which is readily soluble in hydrocarbons and dries rapidly to a waterproof, elastic film, especially if a small amount of a siccative such as cobalt linoleate is present.

The quantity of linseed oil fatty acids may be varied considerably from that given above, and in addition, raw linseel oil, China wood, or other drying or semi-drying oil may be added to the batch at any time during the condensation process, if desired. For example, one may add 75 parts of raw China wood oil to the above batch during the condensation.

In place of the phthalic anhydride, 1 mole equivalent of any of the dibasic acids enumerated herein may be employed. In lieu of linseed oil fatty acids given in the above formula, an equal weight of China wood oil fatty acids (crude mixture obtained by hydrolysis) or rape seed oil fatty acids, or castor oil fatty acids may be used in the condensation, and drying oils or other vegetable oil added thereto during the condensation if desired.

*Example 3*

202 parts sebacic acid (1 mole), 332 parts (1 mole) of 9,10,12-trihydroxy stearic acid of melting point 105–110° C. and 260 parts of raw castor oil are heated at 200–210° C. until a viscous, rubbery resin is obtained. The product is soluble in butyl acetate.

If desired, other fatty oils such as linseed oil, rape seed oil, China wood oil, soya bean oil, and the like may be added to the above mixture during the condensation process in order to obtain a dispersion of the resin in the added oil. Drying oil fatty acids such as linseed oil acids amounting to 20 percent of the total batch weight may be added if desired.

*Example 4*

270 parts benzophenone-2,4'-dicarboxylic acid, 350 parts 9,10,12,13-tetrahydroxy stearic acid (sativic acid) of melting point 170–173° C. or of the crude mixture of polyhydroxy stearic acids obtained by oxidizing linseed oil fatty acids with dilute alkaline potassium permanganate, are mixed with 280 grams of the fatty acid mixture obtained from the hydrolysis of raw linseed oil (hereafter referred to as "linseed oil fatty acids"), and heated at 200° C. with stirring in an atmosphere of carbon dioxide until a tough, resinous condensation product soluble in butyl acetate is formed.

In lieu of the linseed oil fatty acids one may use castor oil fatty acids, tung oil fatty acids, and other drying oil fatty acids or semi-drying oil fatty acids, either alone or admixed with unhydrolyzed oils of the drying or semi-drying type.

In an analogous manner other polyhydroxylated monobasic acids of the general formula $C_nH_{2n-y}(OH)_{y+1}\text{-}(COOH)$ may be condensed with polybasic organic acids, either alone, or in the presence of fatty acids derived from the hydrolysis of natural fatty glycerides of the drying oil type, or semi-drying oil type; with or without the addition of unhydrolyzed fatty glycerides to yield valuable resinous masses of the general class described herein. If desired, organic solvents for the resin, or high boiling liquids such as cyclohexanol capryl alcohol or diethylene glycol monobutyl ether, may be added to the mixture of any or all of the above, during the condensation process in order to form a solution of the resin in the liquid.

The resins obtained by the above general process may be used as primers and surfacers on automobile bodies in conjunction with pigments so as to produce hard, resistant coatings. They may likewise be employed in cellulosic lacquers, more especially nitrocellulose, as plasticizers for coating leather and other porous surfaces such as wood, cloth, rubber, artificial leather, and the like as well as sheet metal.

It is understood herein, that one may substitute the crude mixture of polyhydroxy fatty acids as derived from the oxidation of unsaturated fatty glycerides or as derived from the oxidation of the hydrolysis products of unsaturated fatty glycerides, for the purified polyhydroxy acids as set forth in the examples, weight for weight, and obtain technically valuable resins; furthermore that temperatures and proportions other than those stated may be used, and the reactions carried out under reduced pressure or super atmospheric pressure, with or without the use of esterifying catalysts.

By the term "fatty acids from hydrolysis of natural fatty glycerides" as used herein I mean that this material may be the pure, individually isolated fatty acids or the crude mixture of fatty acids, obtained by hydrolyzing natural, fatty glycerides, such acids being essentially monobasic and not containing polyhydroxyl groups.

By the term "drying oil fatty acids" as used herein I mean that this material is the crude mixture of fatty acids obtained from the hydrolysis of drying oils and consisting essentially of unsaturated monobasic acids not containing polyhydroxyl groups.

By the term "polyhydroxylated monobasic acid" as used herein. I mean that this material may be purified, individually isolated acid or the crude mixture of such acids obtained by oxidizing unsaturated fatty glycerides or by oxidizing fatty acids from the hydrolysis of unsaturated natural fatty glycerides, and substantially free from non-hydroxylated fatty acids.

By the term "natural fatty glyceride" is meant a natural glyceride which consists of a complex mixture of the glycerides of various fatty acids as for example castor oil, tung oil, rape seed oil, linseed oil, perilla oil, and the like.

What I claim is:

1. A new composition of matter comprising a reaction product of an organic polybasic acid and an aliphatic, polyhydroxylated monobasic acid of the general formula $$C_nH_{2n-y}(OH)_{y+1}\text{-COOH}$$

wherein "$n$" is equal to 17 or 21 and "$y$" is a whole number between 1 and 5 inclusive.

2. A new composition of matter comprising a reaction product of an organic polybasic acid, fatty acids from the hydrolysis of natural fatty glycerides, and a polyhydroxylated monobasic acid of the general formula $C_nH_{2n-y}(OH)_{y+1}$-COOH wherein "$n$" is equal to 17 or 21 and "$y$" is a whole number between 1 and 5 inclusive.

3. A new composition of matter comprising a reaction product of the materials set forth in claim 1 and a natural fatty glyceride.

4. A new composition of matter comprising a reaction product of the materials set forth in claim 2 and a natural fatty glyceride.

5. A new composition of matter comprising a reaction product of an organic polybasic acid, drying oil fatty acids, and a polyhydroxylated monobasic acid of the general formula $C_nH_{2n-y}(OH)_{y+1}$-COOH wherein "$n$" is equal to 17 or 21 and "$y$" is a whole number between 1 and 5 inclusive.

6. A new composition of matter comprising a reaction product of the materials set forth in claim 5 and a natural fatty glyceride.

7. A new composition of matter comprising a reaction product of the materials set forth in claim 5 and a drying oil.

8. A new composition of matter comprising a reaction product of phthalic anhydride and an aliphatic, polyhyroxylated monobasic acid of the general formular $C_nH_{2n-y}(OH)_{y+1}$-COOH wherein "$n$" is equal to 17 or 21 and "$y$" is a whole number between 1 and 5 inclusive.

9. A new composition of matter comprising a reaction product of phthalic anhydride, fatty acids from the hydrolysis of natural, fatty glycerides, and a polyhydroxylated monobasic acid of the general formular $C_nH_{2n-y}(OH)_{y+1}$-COOH wherein "$n$" is equal to 17 or 21 and "$y$" is a whole number between 1 and 5 inclusive.

10. A new composition of matter comprising a reaction product of the materials set forth in claim 8 and a natural, fatty glyceride.

11. A new composition of matter comprising a reaction product of the type set forth in claim 9 and a natural, fatty glyceride.

12. A new composition of matter comprising a reaction product of phthalic anhyride, drying oil fatty acids, and a polyhydroxylated monobasic acid of the general formula $C_nH_{2n-y}(OH)_{y+1}$-COOH wherein "$n$" is equal to 17 or 21 and "$y$" is a whole number between 1 and 5 inclusive.

13. A new composition of matter comprising a reaction product of the material set forth in claim 12, and a natural fatty glyceride.

14. A new composition of matter comprising a resinous reaction product of the materials set forth in claim 12, and a drying oil.

15. A new composition of matter comprising a reaction product of phthalic anhydride, linseed oil fatty acids, and a member of the group consisting of dihydroxystearic acid, trihydroxystearic acid, tetrahydroxystearic acid, hexahydroxystearic acid, and dihydroxy behenic acid.

16. A new composition of matter comprising a reaction product of the materials set forth in claim 15, and China wood oil.

17. A precess for making a condensation product which comprises heating to reaction temperature, a mixture consisting of an organic, polybasic acid and an aliphatic polyhydroxylated monobasic acid of the general formula $C_nH_{2n-y}(OH)_{y+1}$-COOH wherein "$n$" is equal to 17 or 21 and "$y$" a whole number between 1 and 5 inclusive.

18. A process which comprises carrying out the reaction set forth in claim 17, in the presence of a substance of the group consisting of natural, fatty glycerides, and fatty acids from the hydrolysis of natural fatty glycerides.

19. A process which comprises carrying out the reaction set forth in claim 17, in the presence of drying oil fatty acids.

20. A process which comprises carrying out the reaction set forth in claim 17 in the presence of drying oils and drying oil fatty acids.

21. A new composition of matter comprising a resinous reaction product of phthalic anhydride and an acid of the group consisting of dihydroxystearic, trihydroxystearic, tetrahydroxystearic, hexahydroxystearic and dihydroxy-behenic.

22. A new composition of matter comprising a resinous reaction product of the materials described in claim 21 and one of the group consisting of fatty acids from a natural fatty glyceride, natural fatty glycerides, and mixtures thereof.

In testimony whereof I affix my signature.

HERMAN ALEXANDER BRUSON.